US012607524B2

(12) United States Patent
Poenaru et al.

(10) Patent No.: US 12,607,524 B2
(45) Date of Patent: Apr. 21, 2026

(54) NOTIFICATION SENSOR ARRANGEMENT FOR A DIFFERENTIAL PRESSURE SENSOR AND A METHOD FOR OUTPUTTING A SENSED WARNING SIGNAL

(71) Applicants: TE Connectivity Solutions GmbH, Schaffhausen (CH); First Sensor AG, Berlin (DE)

(72) Inventors: Ilie Poenaru, Schaffhausen (CH); Corneliu Tobescu, Schaffhausen (CH); Rafael Teipen, Berlin (DE)

(73) Assignees: TE Connectivity Solutions GmbH, Schaffhausen (CH); First Sensor AG, Berlin (DE)

( * ) Notice: Subject to any disclaimer, the term of this patent is extended or adjusted under 35 U.S.C. 154(b) by 391 days.

(21) Appl. No.: 18/475,630

(22) Filed: Sep. 27, 2023

(65) Prior Publication Data

US 2024/0102873 A1      Mar. 28, 2024

(30) Foreign Application Priority Data

Sep. 27, 2022    (EP) ..................................... 22198016

(51) Int. Cl.
  G01L 1/22       (2006.01)
  G01L 19/12      (2006.01)
(52) U.S. Cl.
  CPC ............ G01L 1/2262 (2013.01); G01L 19/12 (2013.01)
(58) Field of Classification Search
  CPC . G01L 19/147; G01L 9/0072; G01L 19/0645; G01L 19/0084; G01L 13/025;
  (Continued)

(56) References Cited

U.S. PATENT DOCUMENTS 9,804,050 B2 * 10/2017 Landmann ........... G01K 15/005
2012/0006119 A1 * 1/2012 Broden ................. G01L 13/026
                                                            73/716
(Continued)

FOREIGN PATENT DOCUMENTS

EP         1750110 A2 * 2/2007 ........... G01L 13/025
EP         1163492 B1 * 10/2008 ........... G01L 27/005
(Continued)

OTHER PUBLICATIONS

Extended European Search Report from the European Patent Office dated May 19, 2023, corresponding to Application No. 22198016. 2-1001, 13 pages.

*Primary Examiner* — Andre J Allen
(74) *Attorney, Agent, or Firm* — Barley Snyder

(57)                 ABSTRACT

A notification sensor arrangement includes a drift pressure sensor measuring a drift signal indicative of a drift of a differential pressure sensor. The drift pressure sensor has a drift sensing unit formed on or in a symmetrical diaphragm, which has an upper side in fluid communication with a first fluid having a first pressure and a lower side in fluid communication with the first fluid having the first pressure. The notification sensor arrangement includes a comparing unit comparing the drift signal with a predefined threshold value to determine if the drift of the differential pressure sensor is a critical drift, a notification unit outputting a warning signal in response to a determination of the critical drift, and a base supporting the drift pressure sensor and the differential pressure sensor.

19 Claims, 4 Drawing Sheets

(58) Field of Classification Search

CPC ............... G01L 19/0007; G01L 9/0042; G01L 19/0038; G01L 9/0073; G01L 9/0075; G01L 9/0054; G01L 9/0055; G01L 19/04; G01L 7/00; G01L 7/04; G01L 19/148; G01L 19/14; G01L 19/143; G01L 17/00; G01L 7/18; G01L 19/0092; G01L 15/00; G01L 9/0051; G01L 7/041; G01L 9/12; G01L 9/065; G01L 19/0618; G01L 9/0052; G01L 9/125; G01L 7/16; G01L 19/0609; G01L 19/003; G01L 9/007; G01L 19/0627; G01L 19/0046; G01L 9/0022; G01L 9/06; G01L 19/0636; G01L 7/084; G01L 13/02; G01L 19/0023; G01L 19/142; G01L 7/043; G01L 19/08; G01L 9/0002; G01L 19/02; G01L 9/008; G01L 19/141; G01L 9/006; G01L 11/02; G01L 19/0672; G01L 23/10; G01L 23/18; G01L 19/0681; G01L 9/0077; G01L 19/12; G01L 27/005; G01L 7/082; G01L 9/0044; G01L 19/0015; G01L 19/0069; G01L 7/063; G01L 9/0001; G01L 19/146; G01L 21/12; G01L 27/002; G01L 27/007; G01L 9/16; G01L 11/00; G01L 19/00; G01L 9/0026; G01L 9/0089; G01L 9/045; G01L 9/14; G01L 19/0654; G01L 1/2281; G01L 11/025; G01L 13/026; G01L 11/008; G01L 7/22; G01L 13/00; G01L 9/0047; G01L 7/08; G01L 9/0076; G01L 9/0025; G01L 9/0035; G01L 19/0061; G01L 9/0005; G01L 9/0041; G01L 9/0019; G01L 9/08; G01L 9/10; G01L 21/00; G01L 9/04; G01L 11/006; G01L 19/086; G01L 9/00; G01L 9/0008; G01L 1/18; G01L 11/004; G01L 19/069; G01L 9/0057; G01L 19/083; G01L 19/06; G01L 19/10; G01L 19/16; G01L 9/0016; G01L 13/023; G01L 7/048; G01L 9/0048; G01L 9/0027; G01L 9/086; G01L 9/0079; G01L 11/04; G01L 1/20; G01L 9/0091; G01L 27/00; G01L 11/002; G01L 23/24; G01L 7/182; G01L 1/02; G01L 19/0663; G01L 7/166; G01L 23/22; G01L 9/0036; G01L 9/0061; G01L 9/0039; G01L 23/125; G01L 19/145; G01L 9/0013; G01L 21/04; G01L 9/0045; G01L 9/0092; G01L 1/142; G01L 7/104; G01L 9/0033; G01L 9/0083; G01L 9/0098; G01L 1/2293; G01L 7/24; G01L 9/02; G01L 21/22; G01L 9/0029; G01L 7/022; G01L 1/205; G01L 9/0064; G01L 23/08; G01L 5/14; G01L 13/06; G01L 23/16; G01L 7/088; G01L 7/163; G01L 9/0007; G01L 23/222; G01L 1/16; G01L 1/2287; G01L 9/0085; G01L 9/025; G01L 1/2212; G01L 21/14; G01L 9/0004; G01L 23/02; G01L 9/003; G01L 9/085; G01L 1/14; G01L 1/148; G01L 9/0058; G01L 9/105; G01L 7/02; G01L 7/061; G01L 9/002; G01L 1/2231; G01L 13/028; G01L 9/0095; G01L 23/28; G01L 1/162; G01L 19/0076; G01L 7/12; G01L 9/0038; G01L 9/0032; G01L 21/10; G01L 7/024; G01L 19/149; G01L 1/246

USPC ...................................................... 73/700–756

See application file for complete search history.

(56) References Cited

U.S. PATENT DOCUMENTS

| | | | |
|---|---|---|---|
| 2014/0298884 A1 | 10/2014 | Mindlin et al. | |
| 2017/0160155 A1* | 6/2017 | Nguyen | G01L 9/065 |
| 2017/0167939 A1* | 6/2017 | Kastelein | G01L 27/005 |
| 2018/0136066 A1 | 5/2018 | Wagner et al. | |
| 2020/0378853 A1* | 12/2020 | Landmann | G01L 19/06 |

FOREIGN PATENT DOCUMENTS

| | | | |
|---|---|---|---|
| EP | 3287758 A1 | 2/2018 | |
| EP | 2986961 B1 * | 3/2019 | G01L 13/02 |

* cited by examiner

NOTIFICATION SENSOR ARRANGEMENT FOR A DIFFERENTIAL PRESSURE SENSOR AND A METHOD FOR OUTPUTTING A SENSED WARNING SIGNAL

CROSS-REFERENCE TO RELATED APPLICATIONS

This application claims the benefit of the filing date under 35 U.S.C. § 119(a)-(d) of European Patent Application No. 22198016.2, filed on Sep. 27, 2022.

FIELD OF THE INVENTION

The invention relates to a notification sensor arrangement for a differential pressure sensor and a method for outputting a sensed warning signal.

BACKGROUND

A pressure sensor is a device for pressure measurement of fluids, i.e., gases or liquids. Pressure is an expression of the force required to stop a fluid from expanding and is usually stated in terms of force per unit area. A pressure sensor usually acts as a transducer; it generates a signal as a function of the pressure imposed.

A differential pressure sensor measures the difference between two pressures, one connected to each side of the sensor, i.e., an upper side and an opposing lower side of the pressure sensor. In more detail, differential pressure sensors measure a difference in pressure between two points of measurement (e.g., P1 and P2) of a fluid. A differential pressure sensor (or transducer) converts the pressure difference to an electrical signal that can be measured to determine the differential pressure.

Differential pressure sensors are used to measure many properties, such as pressure drops across oil filters or air filters, fluid levels (by comparing the pressure above and below the liquid) or flow rates (by measuring the change in pressure across a restriction, i.e. a differential pressure sensor may be used in an oil pipe to measure the pressure before and after an orifice in the fuel pipe, from which the flow rate of the oil can be determined). Technically speaking, most pressure sensors are really differential pressure sensors; for example, a gauge pressure sensor is a differential pressure sensor in which one side is open to the ambient atmosphere. Further, an absolute pressure sensor is a differential pressure sensor in which one pressure chamber is closed and contains vacuum.

Such devices can be manufactured using micro-machined or Micro-Electro-Mechanical System (MEMS) based techniques. One common technique for manufacturing a pressure sensor is to attach a MEMS device onto a substrate, such as a ceramic or printed circuit board (PCB) substrate, along with etching and bonding techniques to fabricate very small, inexpensive devices.

A problem with a differential pressure sensor is that the pressure sensor may drift over lifetime. As used herein, a drift is a comparatively long-term change in an attribute, value, or operational parameter of a system or equipment, here the sensor. An output level drift characterizes the drift. The output level drift is an unintended and generally arbitrary offset. Causes may include component aging, changes in temperature, or problems with a voltage regulator, which controls voltages of the sensor.

To solve the problem of the drift, usually operators replace the sensor devices after a certain operation duration.

In absence of any knowledge of the real drift, worst case scenarios must be considered to prevent damaged sensors staying in operation, which reduces the product lifetime and increases cost of ownership.

There is a need for a differential pressure sensor that has a long lifetime, in particular that needs not to be replaced after a predefined fixed time. Further, the pressure sensor should be able to be fabricated economically, i.e., without adding costly circuits for determining the drift. Further, there is a need for a sensor that enables a user receiving information indicative of the drift of a differential pressure sensor.

SUMMARY

A notification sensor arrangement includes a drift pressure sensor measuring a drift signal indicative of a drift of a differential pressure sensor. The drift pressure sensor has a drift sensing unit formed on or in a symmetrical diaphragm, which has an upper side in fluid communication with a first fluid having a first pressure and a lower side in fluid communication with the first fluid having the first pressure. The notification sensor arrangement includes a comparing unit comparing the drift signal with a predefined threshold value to determine if the drift of the differential pressure sensor is a critical drift, a notification unit outputting a warning signal in response to a determination of the critical drift, and a base supporting the drift pressure sensor and the differential pressure sensor.

BRIEF DESCRIPTION OF THE DRAWINGS

Exemplary embodiments of the invention are described by way of the following drawings. In the drawings.

DETAILED DESCRIPTION OF THE EMBODIMENTS

Figure 1:
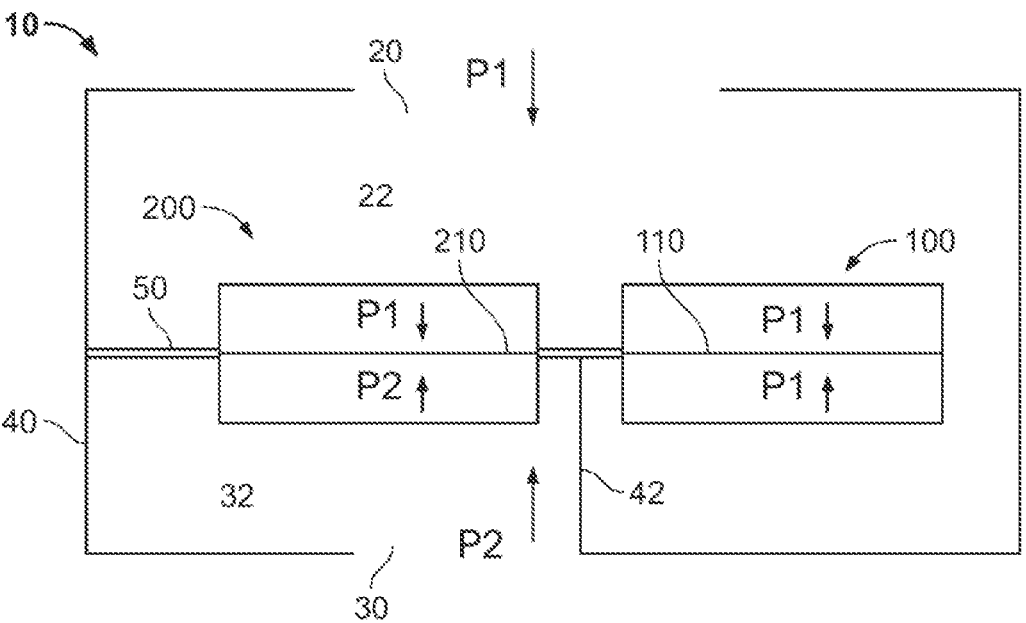
FIG. 1 is a schematic of a notification sensor arrangement according to an example.

The invention will now be described in greater detail and in an exemplary manner using advantageous embodiments and with reference to the drawings. The described embodiments are only possible configurations in which, however, the individual features can be provided independently of one another or can be omitted.

The accompanying drawings are incorporated into the specification and form a part of the specification to illustrate several embodiments of the present invention. These drawings, together with the description, explain the principles of the invention. The drawings are merely for the purpose of illustrating examples of how the invention can be made and used and are not to be construed as limiting the invention to only the illustrated and described embodiments. Furthermore, several aspects of the embodiments may form—individually or in different combinations—solutions according to the present invention. The following described embodiments thus can be considered either alone or in an arbitrary combination thereof.

The described embodiments are merely possible configurations, and it must be borne in mind that the individual features can be provided independently of one another or can be omitted altogether while implementing this invention. Further features and advantages will become apparent from the following more particular description of the various embodiments of the invention, as illustrated in the accompanying drawings, in which like references refer to like elements.

According to a general example, it is known that a differential pressure sensor can comprise a unit for measuring a pressure signal indicative of a differential pressure. Further, the sensor arrangement can comprise additionally a common mode correcting unit for measuring a common mode signal indicative of a common mode of the differential pressure sensor unit.

The inventors found out that the common mode correcting sensor can be alternatively or additionally used as a drift pressure sensor for measuring a drift signal of the common mode correcting sensor. Further, the inventors found out that the drift signal can be indicative of a drift of the differential pressure sensor. In particular, by comparing an output signal of a drift sensor, i.e., a sensor that can be used additionally as common mode correcting sensor, with a predetermined threshold value, it is possible to determine if the drift of the drift pressure sensor is critical, i.e., is above a threshold. As the drift pressure sensor and a differential pressure sensor experience similar environmental conditions, e.g., temperature, stress, voltage fluctuations, humidity, and/or are similarly constructed, the drift signal is indicative of a drift of the differential pressure sensor. Thus, in the case of a critical drift determined by the drift pressure sensor, a notification unit outputs a warning that the differential pressure sensor is not working properly and needs to be refurbished or replaced.

This solution is particularly economic as available components can be used for the sensor, i.e., the common mode correcting sensor can be used as drift pressure senor for the differential pressure sensor. By further adding a comparing unit and a notification unit, an available device can be modified so that a health parameter of the differential pressure sensor can be determined and output.

The present invention will now be explained with reference to the Figures and first with reference to FIG. 1. FIG. 1 shows a differential pressure sensor system 10. The differential pressure sensor system 10 comprises a housing 40 with a first opening 20 and a second opening 30.

The first opening 20 fluidly opens the housing 40 to a first outside region, thereby forming a first pressure chamber 22 in the differential pressure sensor system 10 that contains a fluid at a first pressure P1. The second opening 30 fluidly opens the housing 40 to a second outside region, thereby forming a second pressure chamber 32 in the differential pressure sensor system 10 that contains a fluid at a second pressure P2. As shown in FIG. 1, the first pressure chamber 22 and the second pressure chamber 32 are fluidly sealed form each other. In particular, the housing 40, a wall section 42, and a base 50 fluidly seal the first pressure chamber 22 from the second pressure chamber 42. As used herein, sealing means that passage of fluids from the first chamber 22 to the second chamber 32 is blocked.

The drift pressure sensor 100 may be an electronic pressure sensor. An electronic pressure sensor generally uses a force collector (such a diaphragm, piston, bourdon tube, or bellows) to measure strain (or deflection) due to applied force over an area (pressure).

Further, the base 50 supports a drift pressure sensor 100 of a notification sensor arrangement and a differential pressure sensor 200. As used herein, the base is a supporting platform on which the drift pressure sensor 100 and the differential pressure sensor 200 are mounted in the housing 40. As used herein, a notification sensor arrangement is for example a device comprising in particular sensors and control electronics on a base such as a substrate or chip. Thus, the notification sensor arrangement can determine values, in particular a drift signal, and output a warning signal. As used herein, a warning signal is any signal that conveys information about the drift compared to a predefined threshold.

The base 50 ensures that the pressure sensor and the differential pressure sensor 200 see at least similar environmental parameters, and thus, the drift signal can be used for estimating if the differential pressure sensor has to be replaced or not. In other words, a hardware component, i.e., the base 50, is provided for mechanically connecting the drift pressure sensor 100 and the differential pressure sensor 200 thereto. The base 50 may for example be a housing component housing the sensors.

The notification sensor arrangement comprises the drift pressure sensor 100 and can comprise the differential pressure sensor 200. In particular, the drift pressure sensor 100 and the differential pressure sensor 200 can be arranged in the housing 40. Alternatively, the drift pressure sensor 100 and the differential pressure sensor 200 can be two independent entities and for example have similar properties, i.e., two sensors equally arranged and arranged side by side.

Figure 4:
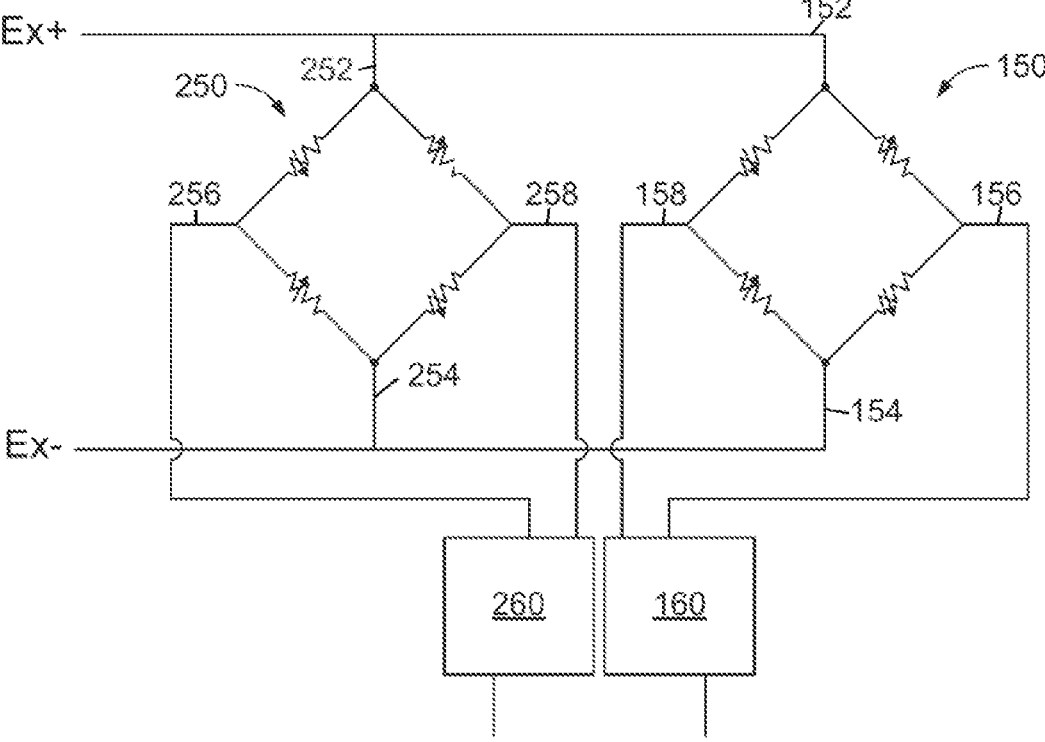
FIG. 4 is a schematic circuit diagram of a notification sensor arrangement according to an example.

The drift pressure sensor 100 comprises a drift sensing unit, i.e., a force collector as for example shown in FIG. 4, formed on or in a symmetrical diaphragm 110. The symmetrical diaphragm has an upper side configured to be in fluid communication with the first fluid having the first pressure P1, i.e., being in fluid connection with the first pressure chamber 22. Further, the symmetrical diaphragm 110 has a lower side, the lower side opposing the upper side, the lower side configured to be in fluid communication with the first fluid having the first pressure P1, being in fluid connection with the first pressure chamber 22. As used herein, a diaphragm is a flexible membrane separating two chambers and fixed around its periphery that distends into one or other chamber as the difference in the pressure in the chambers varies.

A drift sensing unit 150 is constructed for operating as a differential pressure sensor and is integrated for sensing to a differential pressure that is zero. Both sides of the drift sensing unit 150 see the same pressure, and thus, the drift sensing unit only measures errors of the drift sensing sensor. For example, the drift sensing unit 150 measures effects of component aging, changes in temperature, voltage fluctuations, mounting stresses or the like.

Further, the differential pressure sensor system 10 comprises the differential pressure sensor 200. The differential pressure sensor 200 comprises a differential pressure sensing unit, i.e., a force collector as for example shown in FIG. 4, formed on or in a differential diaphragm 210. The differential diaphragm 210 has an upper side configured to be in fluid communication with the first fluid having the first pressure P1, i.e., being in fluid connection with the first pressure chamber 22. Further, the differential diaphragm 210 has a lower side, the lower side opposing the upper side, the lower side configured to be in fluid communication with the second fluid having the second pressure P2, i.e., being in fluid connection with the second pressure chamber 32.

The first and second fluid connection are not fluidly connected, and thus, a differential pressure sensing unit 250 measures the differential pressure signal. This differential pressure signal is a superposed signal comprising the differential pressure and an error signal of a drift. Effects such as component aging, changes in temperature, voltage fluctuations, or the like may cause the error signal. As discussed above, it has been identified that the errors of the differential pressure sensor and errors of the drift sensor can be similar, in particular in case the differential pressure sensor and the drift pressure sensor are subject to similar environmental conditions and/or are similarly constructed.

Figure 2:
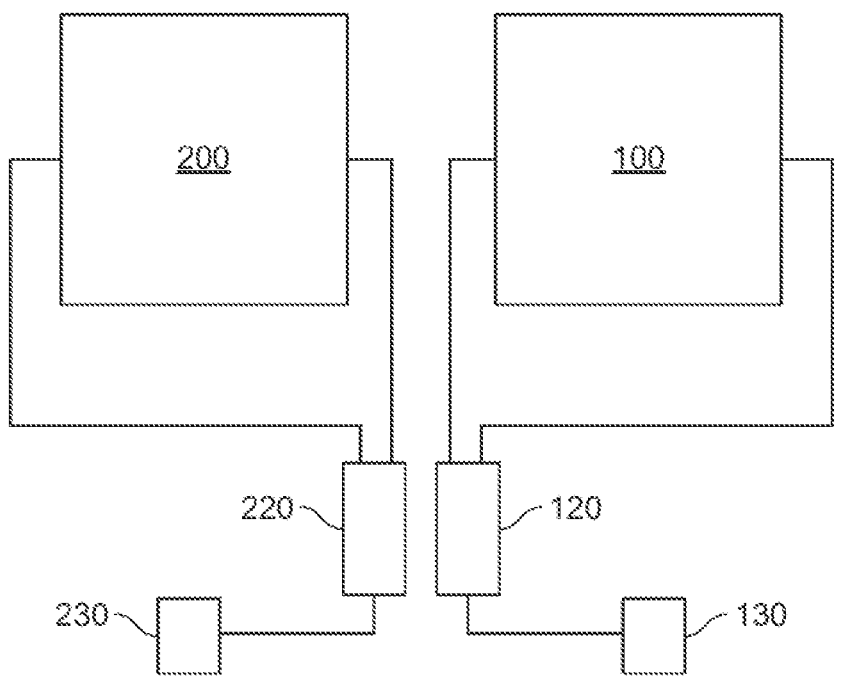
FIG. 2 is a schematic block diagram of a notification sensor arrangement according to an example.

Further, FIG. 2 shows a block diagram of the differential pressure sensor system 10. In particular, the differential pressure sensor system 10 comprises the drift pressure sensor 100 for measuring a drift signal and the differential pressure sensor 200 for measuring a pressure signal indicative of the differential pressure.

The drift pressure sensor 100 is connected to a comparing unit 120 for comparing the drift signal with a predefined threshold value to determine if the drift of the differential pressure sensor is the critical drift. The comparing unit also can include a temperature compensating unit to reduce well known temperature effects of the drift pressure sensor. Further, the drift pressure sensor 100 is connected to a notification unit 130 for outputting the warning signal in response to the determination of the critical drift. Additionally, the comparing unit 120 can have the functionality for evaluating the drift signal, i.e., generating an output signal indicative of the absolute drift, as for example shown in FIG. 3, which can be output by the notification unit 130. The threshold value is for example a value stored in advance, a value that is for example calculated for predefined environmental conditions (e.g., a threshold value for a predefined temperature or predefined humidity), a predefined value set by a user, or a value input in the comparing unit. The comparing unit 120 may for example compare the analog signal received from the drift sensor or the comparing unit 120 may realize further functions to convert the analog signal to a digital signal for the comparing step.

The notification unit 130 is for example an output device for communication between an information processing system, such as the comparing unit or the processing unit of the comparing unit, e.g., the DSP, and the outside world, possibly a human or another information processing system. Thus, the notification sensor can notify the outside world outside the notification sensor arrangement that the drift is the critical drift.

Notably, the notification unit 130 may output additionally the drift signal. Thus, the drift signal can be evaluated for determining the contribution of environmental factors to the drift. This may be subject to further predictions of sensors not having a notification sensor arrangement or more precise definition of the drift threshold value for sensors with a notification sensor arrangement.

The comparing unit 120 comprises for example a receiving unit, for example an analog front-end (AFE or analog front-end controller AFEC). An AFE is a set of analog signal conditioning circuitry that uses sensitive analog amplifiers, often operational amplifiers, filters, and sometimes application-specific integrated circuits for sensors, radio receivers, and other circuits to provide a configurable and flexible electronics functional block needed to interface a variety of sensors to an antenna, analog-to-digital converter or, in some cases, to a microcontroller. Thus, the comparing unit 120 can receive, by the receiving unit, the drift signal and prepare it for the comparing step, for example to make a digital signal.

Further, the comparing unit 120 can comprise a processing unit, e.g., an analog signal processor or digital signal processor (DSP). A DSP is a specialized microprocessor chip, with its architecture optimized for the operational needs of digital signal processing. DSPs are fabricated on MOS integrated circuit chips. Thus, the processing unit can be used for comparing the drift signal to the threshold for determining if the drift is the critical drift.

The differential pressure sensor 200 for measuring a pressure signal indicative of the differential pressure is connected to an evaluation unit 220 for evaluating the pressure signal. As shown in the example in FIG. 2, the notification unit 230 is configured for outputting the pressure signal.

Additionally, the notification unit 230 can be connected to the communication 120 and can be configured for outputting the pressure signal and/or the drift signal. Even more advantageously, the evaluation unit 220 can be connected to the communication 120, the drift sensor 100, or the notification unit 130 for outputting a common mode correcting pressure signal, i.e., using the drift signal for a common mode correction of the pressure signal.

In particular, the drift pressure sensor 100 and the differential pressure sensor 200 can be formed as Microelectromechanical systems (MEMS). In an embodiment, both sensors are formed by one MEMS. Further details of the drift pressure sensor 100 and the differential pressure sensor 200 will be described with FIGS. 4 and 5.

The comparing unit 120 and/or the evaluation unit 220 is connected to at least one of the pressure sensor 100 and the differential pressure sensor 200. Each of the comparing unit 120 and the evaluation unit 220 can comprise, for example, an analog front end unit (AFE). The AFE can be, for example, a single channel AFE or a double channel AFE. In case of a double channel AFE, one communication may be connected to the drift pressure sensor 100 and the differential pressure sensor 200. Alternatively, or additionally, the comparing unit 120 and/or the evaluation unit 220 can comprise a digital signal processor (DSP). Alternatively, or additionally, the comparing unit 120 and/or the evaluation unit 220 can comprise an internal or external processing unit, e.g., a microcontroller MCU.

In an embodiment, a dual channel digital evaluation unit is used. An analog option can be cheaper, however, may be less precise. An alternative for the dual channel solution is a solution with two single channel units.

Connected to the comparing unit 120 and/or the evaluation unit 220 is at least one of the notification unit 130 and notification unit 230. Each of the comparing units 130 and 230 is a device having at least an output functionality for outputting the warning. Alternatively, the notification unit 130 and/or 230 can be an input/output device (I/O). Thus, the I/O device can be used to additionally receive an input. The input can, for example, be the predefined threshold or a measurement value, e.g., a temperature, influencing the predefined threshold value. Thus, the comparing unit 120 can be adapted for modifying the predefined threshold based on an input.

Figure 3:
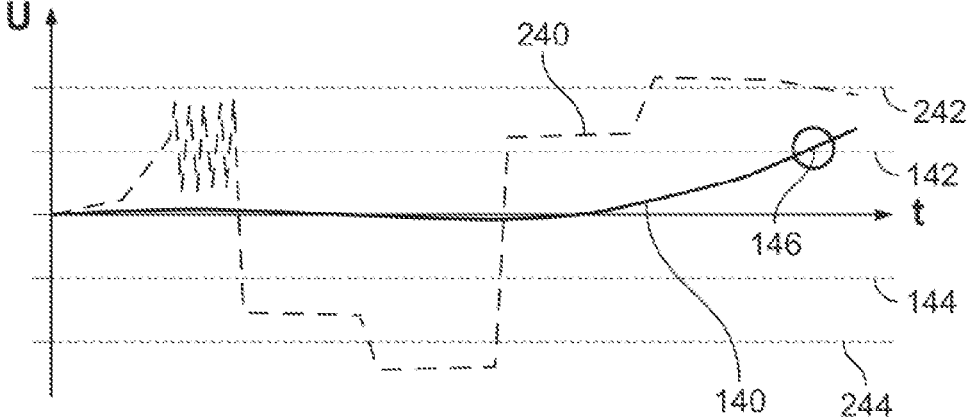
FIG. 3 is a schematic graph of a drift signal and a pressure signal.

Further, FIG. 3 shows an example of a drift signal 140 based on the output of the drift sensing unit and a pressure signal 240 based on the output of differential pressure sensing unit. According to the example, the drift signal 140 and the pressure signal 240 are measured in a voltage [V] as a function of time [t]. For example, the drift signal 140 is output by the notification unit 130 and the pressure signal 240 is output by the notification unit 230. The drift signal 140 is indicative of effects causing a drift of the drift pressure sensor 100 and the base 50. In other words, the signal of the drift pressure sensor 100 can be used as an estimation for the drift of the differential pressure sensor 200, which is also supported by the base. Advantageously, drift effects influence the drift pressure sensor 100 and differential pressure sensor 200 similarly. For example, the pressure sensor 100 and differential pressure sensor 200 have a similar or identical circuit configuration, are similar dimensioned, and comprise similar materials.

The pressure signal 240 shown in FIG. 3 is indicative of the difference of the differential pressure and the drift pressure sensor 100. In other words, the differential pressure signal 240 is a superposition of the drift signal 140 and a signal indicative of the differential pressure.

Further, the example shows an upper threshold value 142 and a lower threshold value 144 for the drift signal 140. Further, the example shows an upper range limit 242, also referred to as upper measurement value 242, and a lower range limit 244, also referred to as a lower measurement value 244, for the pressure signal.

As for example shown, the differential pressure signal 240 may be out of the range limit 242 or 244, e.g., by an under pressure or an overpressure outside the measurement range of the sensor. This situation may be only temporary. In such a case, the differential pressure sensor system 10 may output an error signal. After such an under- or overpressure, the differential pressure sensor system 10 may output again a reliable differential pressure signal 240, i.e., being fully functional.

Further, the drift signal 140 may increase and decrease with time t. However, as soon as the drift signal becomes larger or smaller than a predefined threshold, e.g., the upper threshold value 142 at a time corresponding to the time indicated by reference 146, the notification sensor arrangement may output a warning indicative that the drift of the differential pressure sensor is critical. Thus, an operator may refurbish, replace or recalibrate the differential pressure sensor system 10. In other words, the differential pressure sensor system 10 cannot output again a reliable differential pressure signal 240. Using the drift signal 140 of the notification sensor arrangement allows using an output of the notification unit rather than a previously estimated lifetime of the differential pressure sensor.

Further, FIG. 4 shows an example of a schematic circuit diagram of differential pressure sensor system 10. In particular, the drift pressure sensor, for example the drift pressure sensor 100 of FIG. 1 or 2, comprises a drift sensing unit 150 and the differential pressure sensor, for example the drift pressure sensor 200 of FIG. 1 or 2, comprises the differential pressure sensing unit 250. As shown for example in FIG. 4, the drift sensing unit 150 and the differential pressure sensing unit 250 have an identical circuit configuration. In another embodiment, the circuit configuration can be different.

In particular, the drift sensing unit 150 and the differential pressure sensing unit 250 are formed each by a plurality of four strain gauges, which are arranged in a Wheatstone bridge circuit configuration. In particular, a piezoresistive strain gauge can be used. Alternatives for a (piezoresistive) strain gauge is for example a sensor using electromagnetic, a piezoelectric, an optical, a capacitive, a potentiometric, or a force balancing effect. All these sensor types may be used to determine a drift of a sensor. As used herein, strain gauge based pressure sensors use a pressure sensitive element where strain gauges are formed on a diaphragm. This measuring element is the diaphragm described above. The big advantages of this monolithic can-type design are an improved rigidity and the capability to measure highest pressures of up to 15,000 bar.

In an embodiment, the strain gauges use the piezoresistive effect of bonded or formed strain gauges to detect strain due to an applied pressure, electrical resistance increasing as pressure deforms the material. Common technology types are Silicon (Monocrystalline), Polysilicon Thin Film, Bonded Metal Foil, Thick Film, Silicon-on-Sapphire and Sputtered Thin Film. The piezoresistive effect is a change in the electrical resistivity of a semiconductor or metal when mechanical strain is applied. In contrast to the piezoelectric effect, the piezoresistive effect causes a change only in electrical resistance, not in electric potential. The piezoresistive effect of semiconductor materials can be several orders of magnitudes larger than the geometrical effect and is present in materials like germanium, polycrystalline silicon, amorphous silicon, silicon carbide, and single crystal silicon. Hence, semiconductor strain gauges with a very high coefficient of sensitivity can be built. For precision measurements they are more difficult to handle than metal strain gauges, because semiconductor strain gauges are generally sensitive to environmental conditions (especially temperature), and thus, in particular for piezoresistive strain gauges a drift can be critical for the sensor.

Further, the notification sensor arrangement of FIG. 4 comprises a first excitation terminal 152 of the drift Wheatstone bridge circuit 150 and a first excitation terminal 252 of the differential pressure Wheatstone bridge circuit 250. To each of the first terminals 152 and 252 is applied a positive excitation voltage Ex+, for example by an electric connection. For example, an electrical connection connects the first excitation terminal of the drift Wheatstone bridge circuit and the first excitation terminal of the differential pressure Wheatstone bridge circuit. Thus, the drift sensor can identify voltage fluctuations of the driver source of the circuit.

Further, the notification sensor arrangement of FIG. 4 comprises a second excitation terminal 154 of the drift Wheatstone bridge circuit 150 and a second excitation terminal 254 of the differential pressure Wheatstone bridge circuit 250. To each of the second terminals 154 and 254 is applied a negative excitation voltage Ex−, for example by an electric connection. For example, an electrical connection connecting the second excitation terminal of the drift Wheatstone bridge circuit and the second excitation terminal of the differential pressure Wheatstone bridge circuit. Thus, the drift sensor can identify voltage fluctuations of the driver source of the circuit.

A Wheatstone bridge, i.e., the drift Wheatstone bridge circuit 150 and the differential pressure Wheatstone bridge circuit 250, is an electrical circuit used to measure an unknown electrical resistance by balancing two legs of a bridge circuit, one leg of which includes the unknown component. In particular, each Wheatstone bridge circuit comprises four resistors. The primary benefit of the circuit is its ability to provide extremely accurate measurements (in contrast with something like a simple voltage divider). Its operation is similar to the original potentiometer.

Further, the notification sensor arrangement comprises a drift conversion unit 160 for outputting a drift signal that is converted. The drift conversion unit 160 can for example be comprised in the comparing unit 130, discussed above. In particular, a first and second output terminal 156, 158 of the drift Wheatstone bridge circuit 150 are input to drift conversion unit 160. Thus, the two outputs can be used to generate the drift signal. For example, the drift conversion unit 160 is an AFE as described above and the differential pressure conversion unit 260 is an AFE as described above.

Further, a first and second output terminal 256, 258 of the differential pressure Wheatstone bridge circuit 250 are input to a differential pressure conversion unit 260. The drift conversion unit 260 can for example be comprised in the comparing unit 230, discussed above. Thus, the two outputs can be used to generate the pressure signal.

Figure 5:
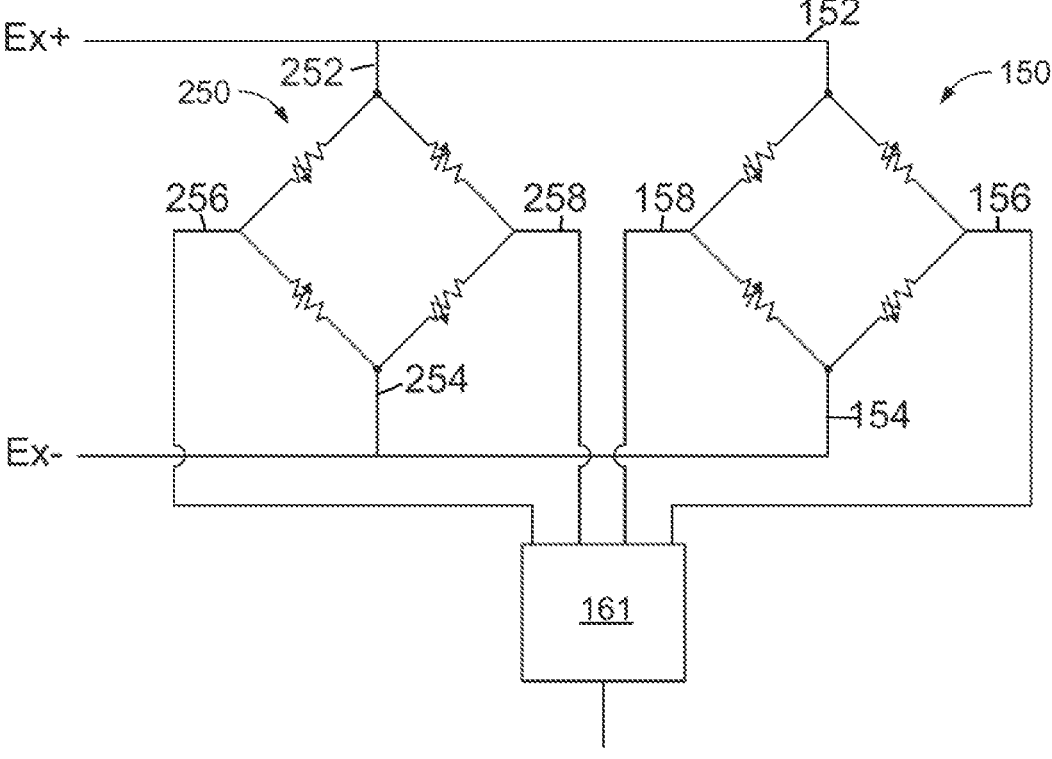
FIG. 5 is a schematic circuit diagram of a notification sensor arrangement according to a further example.

According to an alternative, as shown for example in FIG. 5, the notification sensor arrangement comprises a dual channel conversion unit 161, the dual channel conversion unit comprises the drift conversion unit 160 and the differential pressure a conversion unit 161. The dual conversion unit 161 can for example be comprised in the comparing unit 130, discussed above, the evaluation unit 230. Alternatively, the dual conversion unit 161 can have two outputs, one input in the comparing unit 130 and one in the evaluation unit 230. Thus, one conversion unit 161 can be used to output the drift signal and the differential pressure signal.

The notification sensor arrangement can comprise a first summing amplifier for connecting to a first output terminal of the drift Wheatstone bridge circuit and a first output terminal of the differential pressure Wheatstone bridge. Further, the notification sensor arrangement can comprise a second summing amplifier for connecting to a second output terminal of the drift Wheatstone bridge circuit and a second output terminal of the differential pressure Wheatstone bridge circuit. Each summing amplifier can be used for outputting a differential pressure signal that is common mode corrected. The summing amplifier can be arranged for summing analog signals, i.e., in the conversion unit 160, 260, 161. The conversion unit can be arranged between the Wheatstone bridges 150, 250 and the comparing/evaluation unit 120,220 of FIG. 2. Alternatively, the summing amplifier can be used for summing digital signal, i.e., between the comparing/evaluation unit 120,220 and notification unit 130, 230.

Each of the first and second summing amplifier may be analog summing amplifiers or in an alternative example, may be implemented as digital summing amplifiers. When optionally implemented as digital summing amplifiers, the outputs of the differential pressure Wheatstone bridge and the drift Wheatstone bridge circuit are input to analog to digital converters (ADC). The outputs are digitized and then summed by digital first and second summing amplifiers. In an example, the ADCs may be omitted and analog first and second summing amplifiers may be used. Accordingly, common mode correction may be performed in analog or digitally. A digital architecture requiring additional components and increased complexity.

In an embodiment, the notification sensor arrangement can comprise a storage unit, which stores the initial pressure- and temperature dependent reading of the reference bridge from calibration. The predefined threshold can be based on such initial parameters, for example can be determined or selected. Alternatively, an external value, e.g., a temperature, can be used to select an appropriate predefined threshold. The storage unit may be part of the comparing unit 120 and/or 220. For example, the storage unit is for example a non-volatile storage, e.g., an erasable programmable read-only memory (EPROM). Thus, it is ensured that the chip retains its data even when its power supply is switched off.

In an embodiment, the notification sensor arrangement can comprise a temperature sensor for measuring a temperature of the base. Further, the notification sensor arrangement can comprise a determination unit, which is capable to evaluate a temperature compensated signal for the differential pressure Wheatstone bridge circuit and the drift Wheatstone bridge circuit. In another embodiment, the notification sensor arrangement can include a humidity of the fluids, a pressure of the fluids, or the operation time of the notification arrangement. Further, the comparing unit determines the critical drift based on the drift signal, the predetermined threshold, and the environmental parameter. Thus, the predefined value may be selected for various environmental parameters, and thus, the critical drift can be more accurately determined, and thus, the lifetime of the differential pressure sensor can be increased.

In more detail, a "mission profile", i.e., the drift during the lifetime of the sensor, is defined from environmental parameters such as pressure, temperature, humidity and/or other environmental parameters (e.g., voltage, vibration, acceleration). Based on the real mission profile, in the future the threshold value based on experience might be re-adjusted during operation. E.g., a 5 mV offset voltage drift due to strong external voltages might be more critical than a 5 mV offset voltage drift due to increased humidity. Thus, the critical drift can be determined based on the drift signal, and the predetermined threshold, which can be adjusted based on environmental parameters.

In particular, the above-described entities are configured for performing the functions. For example, the notification sensor arrangement can be configured for outputting the warning signal. The drift pressure sensor can be configured for measuring the drift signal. The comparing unit can be configured for comparing the drift signal with the predefined threshold. The notification unit can be configured for outputting the warning signal and optionally the pressure signal. The drift conversion unit is configured for outputting the converted drift signal. The differential pressure conversion unit can be configured for outputting the converted differential pressure signal. The dual channel conversion unit can be configured for outputting the converted drift signal and the converted differential pressure signal. The differential pressure sensor can be configured for measuring the pressure signal. The evaluation unit can be configured for evaluating the pressure signal and optionally the drift signal.

With regard to the above, a plurality of units, in particular the comparing unit, the notification unit, the conversion unit, the evaluation unit have been described. It should be understood that the comparing unit, the notification unit, the evaluation unit, and the conversion unit can be integrated with the sensing units, for example by forming a MEMS mounted on a substrate, such as a ceramic or printed circuit board. Alternatively, at least one of the comparing unit, the notification unit, the evaluation unit, and the conversion unit can be external, for example being implemented in a further processing unit outside the substrate comprising the drift sensor and/or the differential pressure sensor.

In an embodiment, the drift pressure sensor 100 is formed as an on-chip element, in the following also referred to as integrated circuit, formed on the symmetric diaphragm or on the same die next to the diaphragm and/or the differential pressure sensor is formed as an on-chip element in the following also referred to as integrated circuit, formed on the differential diaphragm. In particular, the diaphragm can be a thin membrane made of a semiconductor material, e.g., a Si-membrane. The semiconductor membrane contains strain dependent elements, for example two diffused n- or p-wells within a p- or n-substrate, for forming e.g., a piezo-resistors. Alternatives may be strain dependent measuring elements that can be formed on the semiconductor material such as capacitor plates, piezo-electric sensors or the like. The change in strain can be measured by local electronics, which may be formed on the semiconductor material.

An alternative for the on-chip element are strain gauges that are glued or bonded on a diaphragm. In an embodiment, the drift pressure sensor 100 is formed as an on-chip element on the symmetric diaphragm.

As used herein, an on-chip element is a set of electronic circuits on one small flat piece (or "chip") of semiconductor material, usually silicon. For example, the on-chip piezoresistors are for example forming a Wheatstone bridge. This results in circuits that are orders of magnitude smaller, faster, and less expensive than those constructed of discrete electronic components. The IC's mass production capability, reliability, and building-block approach to integrated circuit design has ensured the rapid adoption of standardized ICs in place of designs using discrete transistors.

In an embodiment, the differential pressure sensor 200 further comprises a one-piece die, the one-piece die comprising the symmetrical diaphragm and the differential diaphragm. In an embodiment, the one-piece die forms the base 50.

A method for outputting a sensed warning signal in case of a critical drift of a differential pressure sensor includes the steps: measuring, for example by a drift pressure sensor, a drift signal indicative of a drift of the differential pressure sensor; determining, for example by a comparing unit, based on the measured drift signal and a predefined threshold value, the critical drift; and outputting, for example by a notification unit, in response to the determination of the critical drift, the warning signal.

In an embodiment, the method further comprises the step of measuring an environmental parameter, for example by an environmental parameter sensor, and wherein the critical drift is determined, for example by the comparing unit, based on the measured drift signal, the predetermined threshold value, and the environmental parameter. The environmental parameter sensor can be used to measure a temperature of the base, a humidity of the fluids, a pressure of the fluids, vibration, external voltage, acceleration, or the operation time of the notification arrangement.

In another embodiment, a method for outputting a reliable differential pressure signal of a differential pressure sensor includes the steps: measuring, for example by a drift pressure sensor, a drift signal indicative of a drift of the differential pressure sensor by using a drift sensor; measuring, for example by a differential pressure sensor, a differential pressure signal using a differential pressure sensor; comparing, for example by a comparing unit, the measured drift signal and a predefined threshold value, for determining if the drift of the differential pressure sensor is a critical drift; and outputting, for example by a notification unit, in response to the determination that the drift is the critical drift, a warning signal.

What is claimed is:

1. A notification sensor arrangement, comprising:
a drift pressure sensor measuring a drift signal indicative of a drift of a differential pressure sensor, the differential pressure sensor measuring a pressure signal indicative of a differential pressure, the drift pressure sensor has a drift sensing unit formed on or in a symmetrical diaphragm, the symmetrical diaphragm has an upper side in fluid communication with a first fluid having a first pressure and a lower side in fluid communication with the first fluid having the first pressure, the differential pressure sensor has a differential pressure sensing unit formed on or in a differential diaphragm, the differential diaphragm has an upper side in fluid communication with the first fluid having the first pressure and a lower side in fluid communication with a second fluid having a second pressure;
a comparing unit comparing the drift signal with a predefined threshold value to determine if the drift of the differential pressure sensor is a critical drift;
a notification unit outputting a warning signal in response to a determination of the critical drift; and
a base supporting the drift pressure sensor and the differential pressure sensor.

2. The notification sensor arrangement of claim 1, wherein the drift sensing unit has a strain gauge detecting the drift signal and/or the differential pressure sensing unit has a strain gauge detecting a measurement signal.

3. The notification sensor arrangement of claim 2, wherein the strain gauge of the drift sensing unit and/or the strain gauge of the differential pressure sensing unit uses a piezoresistive effect.

4. The notification sensor arrangement of claim 2, wherein the strain gauge of the drift sensing unit is connected to form a drift Wheatstone bridge circuit and/or the strain gauge of the differential pressure sensing unit to form a differential pressure Wheatstone bridge circuit.

5. The notification sensor arrangement of claim 4, wherein
a first excitation terminal of the drift Wheatstone bridge circuit and a first excitation terminal of the differential pressure Wheatstone bridge circuit each have a positive excitation voltage applied to them, and/or
a second excitation terminal of the drift Wheatstone bridge circuit and a second excitation terminal of the differential pressure Wheatstone bridge circuit each have a negative excitation voltage applied to them.

6. The notification sensor arrangement of claim 4, further comprising a drift conversion unit outputting a converted drift signal, a first output terminal and a second output terminal of the drift Wheatstone bridge circuit are input to the drift conversion unit.

7. The notification sensor arrangement of claim 6, further comprising a differential pressure conversion unit outputting a converted differential pressure signal, a first output terminal and a second output terminal of the differential pressure Wheatstone bridge circuit are input to the differential pressure conversion unit.

8. The notification sensor arrangement of claim 7, further comprising a dual channel conversion unit having the drift conversion unit and the differential pressure conversion unit.

9. The notification sensor arrangement of claim 4, further comprising a first summing amplifier connecting to a first output terminal of the drift Wheatstone bridge circuit and a first output terminal of the differential pressure Wheatstone bridge, and/or a second summing amplifier connecting to a second output terminal of the drift Wheatstone bridge circuit and a second output terminal of the differential pressure Wheatstone bridge circuit.

10. The notification sensor arrangement of claim 9, wherein each of the first summing amplifier and the second summing amplifier outputs a differential pressure signal that is common mode corrected.

11. The notification sensor arrangement of claim 1, further comprising a storage unit storing the predefined threshold value, the comparing unit determines the critical drift when an absolute value of the drift exceeds the predefined threshold value.

12. The notification sensor arrangement of claim 11, further comprising an environmental parameter sensor measuring an environmental parameter, the comparing unit determines the critical drift based on the drift signal, the predefined threshold value, and the environmental parameter.

13. The notification sensor arrangement of claim 12, wherein the environmental parameter is a temperature of the base, a humidity of the fluids, a pressure of the fluids, vibration, external voltage, acceleration, or an operation time of the notification sensor arrangement.

14. A differential pressure sensor system, comprising:
   a differential pressure sensor measuring a pressure signal indicative of a differential pressure, the differential pressure sensor has a differential pressure sensing unit formed on or in a differential diaphragm, the differential diaphragm has an upper side in fluid communication with a first fluid having a first pressure and a lower side in fluid communication with a second fluid having a second pressure;
   a notification sensor arrangement including a drift pressure sensor measuring a drift signal indicative of a drift of the differential pressure sensor, a comparing unit comparing the drift signal with a predefined threshold value to determine if a drift of the differential pressure sensor is a critical drift, a notification unit outputting a warning signal in response to a determination of the critical drift, and a base supporting the drift pressure sensor and the differential pressure sensor, the drift pressure sensor has a drift sensing unit formed on or in a symmetrical diaphragm, the symmetrical diaphragm has an upper side in fluid communication with the first fluid having the first pressure and a lower side in fluid communication with the first fluid having the first pressure; and
   an evaluation unit evaluating the pressure signal and the drift signal, the notification unit outputs at least one of the pressure signal and the drift signal.

15. The differential pressure sensor system of claim 14, wherein the drift pressure sensor is formed as an on-chip element on the symmetrical diaphragm and the differential pressure sensor is formed as an on-chip element on the differential diaphragm.

16. The differential pressure sensor system of claim 15, further comprising a one-piece die, the one-piece die including the symmetrical diaphragm and the differential diaphragm.

17. A method for outputting a sensed warning signal in case of a critical drift of a differential pressure sensor, comprising the steps of:
   measuring a drift signal indicative of a drift of the differential pressure sensor;
   determining, based on the measured drift signal and a predetermined threshold value, a critical drift; and
   outputting, in response to the determination of the critical drift, the warning signal.

18. The method of claim 17, further comprising measuring an environmental parameter, the critical drift is determined based on the measured drift signal, the predetermined threshold value, and the environmental parameter.

19. A method for outputting a reliable differential pressure signal of a differential pressure sensor, comprising the steps of:
   measuring a drift signal indicative of a drift of the differential pressure sensor by using a drift sensor;
   measuring a differential pressure signal using a differential pressure sensor;
   comparing the measured drift signal and a predefined threshold value to determine if the drift of the differential pressure sensor is a critical drift; and
   outputting, in response to the determination that the drift is the critical drift, a warning signal.

* * * * *